(12) United States Patent
Chujo et al.

(10) Patent No.: US 10,062,929 B2
(45) Date of Patent: Aug. 28, 2018

(54) BATTERY UNIT

(71) Applicant: KABUSHIKI KAISHA TOYOTA JIDOSHOKKI, Aichi-ken (JP)

(72) Inventors: Yuki Chujo, Kariya (JP); Takayuki Kato, Kariya (JP); Hiromi Ueda, Kariya (JP); Fumihiko Ishiguro, Kariya (JP); Naoto Morisaku, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 128 days.

(21) Appl. No.: 15/112,857

(22) PCT Filed: Jan. 23, 2015

(86) PCT No.: PCT/JP2015/051821
§ 371 (c)(1),
(2) Date: Jul. 20, 2016

(87) PCT Pub. No.: WO2015/115323
PCT Pub. Date: Aug. 6, 2015

(65) Prior Publication Data
US 2016/0344070 A1    Nov. 24, 2016

(30) Foreign Application Priority Data

Feb. 3, 2014  (JP) .................................. 2014-018581

(51) Int. Cl.
*H01M 10/46*    (2006.01)
*H01M 2/10*    (2006.01)
(Continued)

(52) U.S. Cl.
CPC ........... *H01M 10/46* (2013.01); *B60L 3/0046* (2013.01); *B60L 3/0069* (2013.01);
(Continued)

(58) Field of Classification Search
None
See application file for complete search history.

(56) References Cited

U.S. PATENT DOCUMENTS

| 5,403,679 A | * | 4/1995 | Stone | H01M 2/1077 |
| | | | | 206/512 |
| 2011/0159326 A1 | * | 6/2011 | Oya | B60L 3/0007 |
| | | | | 429/82 |

(Continued)

FOREIGN PATENT DOCUMENTS

| EP | 2 738 834 | 6/2014 |
| JP | 2012-104471 | 5/2012 |

(Continued)

OTHER PUBLICATIONS

Official Action, along with English-language translation thereof, issued in 2014-018581 dated Jun. 27, 2017.

(Continued)

*Primary Examiner* — Tracy M Dove
(74) *Attorney, Agent, or Firm* — Greenblum & Bernstein, P.L.C.

(57) ABSTRACT

A vehicle body includes an accommodating portion that accommodates a battery pack. A communication hole, which connects the outside and the inside the accommodating portion, is formed in one of the side walls of the vehicle body. The battery pack includes battery cells and a sealed case that accommodates the battery cells. The sealed case includes a case main body having an opening and a lid member fixed to the case main body. The lid member has a first releasing portion and a second releasing portion. A connecting portion for connecting a charging plug to the battery pack is inserted in the communication hole. The connecting portion is connected to the battery cells via wires. The first releasing portion and the second releasing (Continued)

portion are arranged to face a wall of an accommodating body.

6 Claims, 4 Drawing Sheets

(51) Int. Cl.
| | | |
|---|---|---|
| *H01M 2/12* | (2006.01) | |
| *B60L 3/00* | (2006.01) | |
| *B60L 11/18* | (2006.01) | |
| *B66F 9/075* | (2006.01) | |
| *H01M 2/20* | (2006.01) | |

(52) U.S. Cl.
CPC ....... *B60L 11/1805* (2013.01); *B60L 11/1818* (2013.01); *B60L 11/1824* (2013.01); *B60L 11/1861* (2013.01); *B60L 11/1864* (2013.01); *B60L 11/1879* (2013.01); *B66F 9/07504* (2013.01); *B66F 9/07572* (2013.01); *H01M 2/1077* (2013.01); *H01M 2/1223* (2013.01); *H01M 2/20* (2013.01); *B60L 2200/42* (2013.01); *B60L 2230/12* (2013.01); *B60L 2240/545* (2013.01); *B60L 2240/547* (2013.01); *B60L 2240/549* (2013.01); *H01M 2220/20* (2013.01); *Y02T 10/7005* (2013.01); *Y02T 10/7044* (2013.01); *Y02T 10/7061* (2013.01); *Y02T 10/7088* (2013.01); *Y02T 90/121* (2013.01); *Y02T 90/14* (2013.01); *Y02T 90/16* (2013.01)

(56) References Cited

U.S. PATENT DOCUMENTS

| | | | |
|---|---|---|---|
| 2012/0114993 A1* | 5/2012 | Park | H01M 2/1072 429/88 |
| 2012/0263982 A1 | 10/2012 | Yasui et al. | |
| 2014/0234062 A1 | 8/2014 | Adachi et al. | |
| 2015/0050530 A1* | 2/2015 | Seimiya | H01M 2/1077 429/61 |

FOREIGN PATENT DOCUMENTS

| | | |
|---|---|---|
| JP | 2012-202066 | 10/2012 |
| WO | 2012/073438 | 6/2012 |
| WO | 2013/018283 | 2/2013 |
| WO | 2013/061869 | 5/2013 |

OTHER PUBLICATIONS

International Search Report for PCT/JP2015/051821 dated Mar. 24, 2015.
Written Opinion of the International Searching Authority for PCT/JP2015/051821 dated Mar. 24, 2015.
International Preliminary Report on Patentability for PCT/JP2015/051821 dated Aug. 9, 2016.

* cited by examiner

BATTERY UNIT

TECHNICAL FIELD

The present invention relates to a battery unit that includes an accommodating body that accommodates a battery pack.

BACKGROUND ART

Battery packs have been known that accommodate battery cells in a sealed case. In a battery pack, the internal pressure of the sealed case must be lowered when the internal pressure is high.

Patent Document 1 discloses a battery module that accommodates rechargeable batteries in a housing. A gas discharging member, which is opened at a preset pressure, is attached to each rechargeable battery. The housing has a gas discharging hole and a valve member, which closes the gas discharging hole. In the battery module, the valve member is opened when the internal pressure of the housing reaches a preset pressure.

Typically, a cable is attached to the battery pack to connect the battery pack to an external device. In the configuration of Patent Document 1, opening the valve member may cause gas to be discharged from the housing toward the cable. This may damage the cable and thus hamper charging/discharging of the battery pack.

PRIOR ART DOCUMENT

Patent Document

Patent Document 1: Japanese Laid-Open Patent Publication No. 2012-104471

SUMMARY OF THE INVENTION

Problems that the Invention is to Solve

Accordingly, it is an objective of the present invention to provide a battery unit that is configured to restrain damage to a cable.

Means for Solving the Problems

To achieve the foregoing objective and in accordance with one aspect of the present invention, a battery unit including a battery pack and an accommodating body is provided. The accommodating body includes an accommodating portion, which accommodates the battery pack. The battery pack includes a battery module, which is configured by a plurality of battery cells, a sealed case, which accommodates the battery module, and a connector, which is provided in the sealed case and to which a cable for supplying power to the battery module is connected. The accommodating body includes a communication hole, which connects an inside and an outside of the accommodating portion to each other. The sealed case includes a releasing portion, which releases a pressure in the sealed case. The releasing portion is arranged to face a wall of the accommodating body.

With this configuration, when the releasing portion is opened, the gas in the sealed case is discharged toward the wall of the accommodating body. The cable is connected to the connector and extends to the communication hole from the connector. With this configuration, since the releasing portion is not arranged to face the communication hole, the cable is not directly exposed to the gas discharged from the sealed case. This restrains damage to the cable by the gas discharged from the sealed case.

The releasing portion is preferably arranged such that an imaginary line connecting the releasing portion and the wall of the accommodating body does not overlap with the communication hole.

The releasing portion is preferably arranged to face a wall of the accommodating body that is different from the wall that has the communication hole.

The releasing portion is preferably arranged to face a wall of the accommodating body that is on a opposite side from the wall that has the communication hole.

With this configuration, when the releasing portion is opened, the gas in the sealed case is discharged in a direction opposite from the cable. This further effectively restrains damage to the cable.

MODES FOR CARRYING OUT THE INVENTION

A battery unit according to one embodiment of the present invention will now be described with reference to FIGS. 1 to 5. The battery unit is mounted in a forklift. In the following description, the forward, backward, leftward, rightward, upward, and downward directions are defined with reference to the state in which the operator of the forklift is facing forward.

Figure 1:
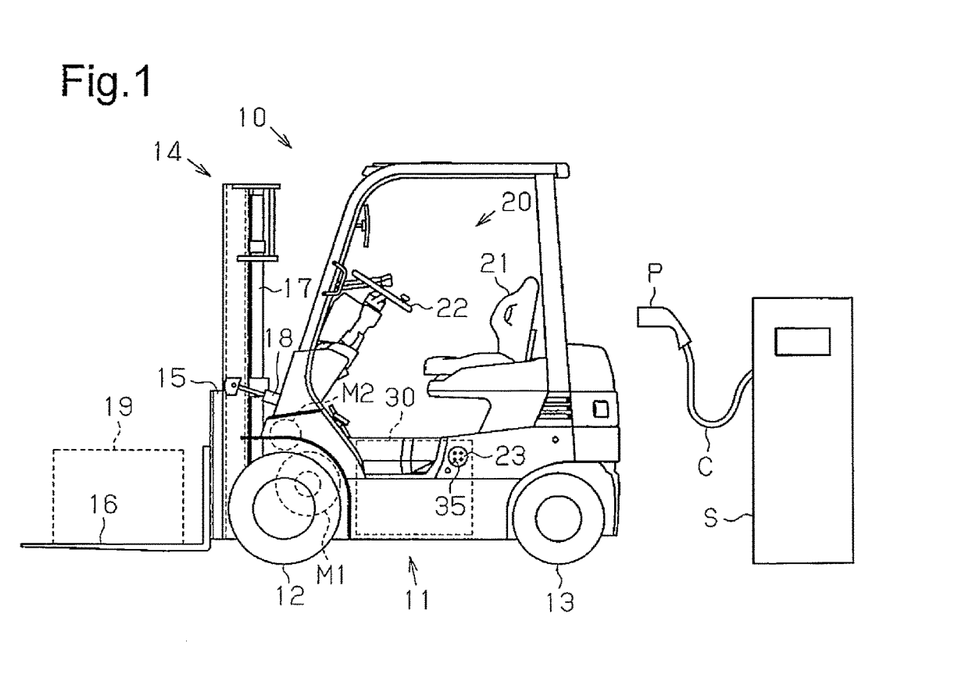
FIG. 1 is a side view of a forklift in which a battery unit according to the present invention is mounted.
Figure 2:
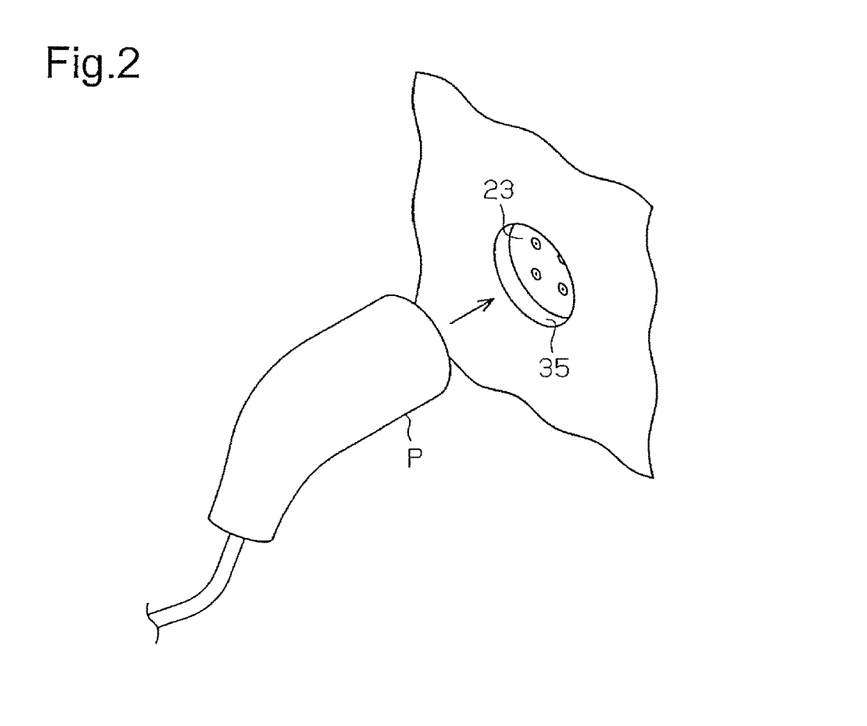
FIG. 2 is a perspective view illustrating a connecting portion of the forklift and a charging plug.

As shown in FIGS. 1 and 2, a forklift 10, which is an industrial vehicle, includes drive wheels 12 at a front lower part of a vehicle body 11. The forklift 10 also includes steerable wheels 13 at a rear lower part of the vehicle body 11. The forklift 10 further includes a cargo handling device at the front part of the vehicle body 11. The cargo handling device includes a mast 14, which is attached to the front part of the vehicle body 11 and extends upward. A pair of left and right forks 16 is attached to the mast 14 via a lift bracket 15. Lift cylinders 17 and tilt cylinders 18 are coupled to the mast 14 to operate the forks 16. The forks 16 are lifted and lowered together with the lift bracket 15 by the lift cylinders 17. The forks 16 are tilted together with the mast 14 by the tilt cylinders 18. A cargo 19 is mounted on the forks 16. The vehicle body 11 includes a vehicle driving motor M1, which functions as the driving source for the drive wheels 12, and a cargo handling motor M2, which functions as the driving source for the forks 16.

A cab 20 is arranged at the center of the vehicle body 11. An operator seat 21, on which the operator is seated, is provided in the cab 20. A steering wheel 22 is arranged in front of the operator seat 21. A battery pack 30 is mounted in the vehicle body 11 below the cab 20. The forklift 10 is a battery forklift having the vehicle driving motor M1 and the cargo handling motor M2. The vehicle driving motor M1 and the cargo handling motor M2 are driven by the battery pack 30, which serves as a power source. The vehicle body 11 includes a connecting portion 23, via which a charging plug P is connected to the battery pack 30. The battery pack 30 is connected to a charging station S, which is an external device, via a cable C, which has the charging plug P.

Figure 3:
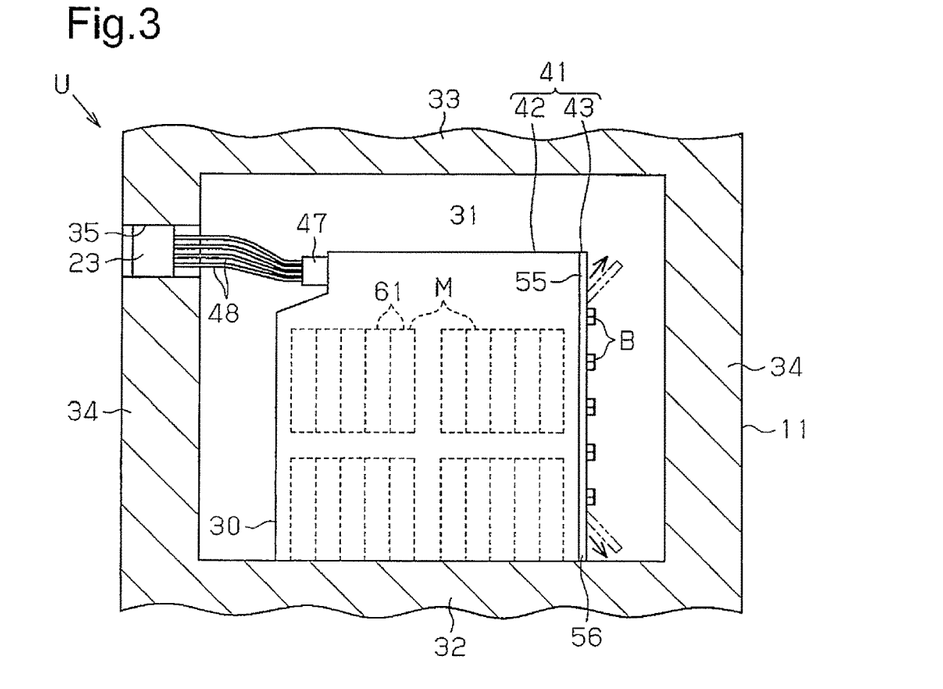
FIG. 3 is a cross-sectional view showing a battery unit.

As shown in FIG. 3, the vehicle body 11, which serves as an accommodating body, includes an accommodating portion 31, which accommodates the battery pack 30. The vehicle body 11 and the battery pack 30 configure a battery unit U. The accommodating portion 31 is a rectangular space surrounded by six walls. A bottom wall 32, on which the battery pack 30 is placed, an upper wall 33, which is located on the opposite side from the bottom wall 32, and four side walls 34 configure the walls of the accommodating body. One of the side walls 34 has a communication hole 35, which connects the outside and the inside of the accommodating portion 31 to each other. The connecting portion 23 is inserted in the communication hole 35.

Figure 4:
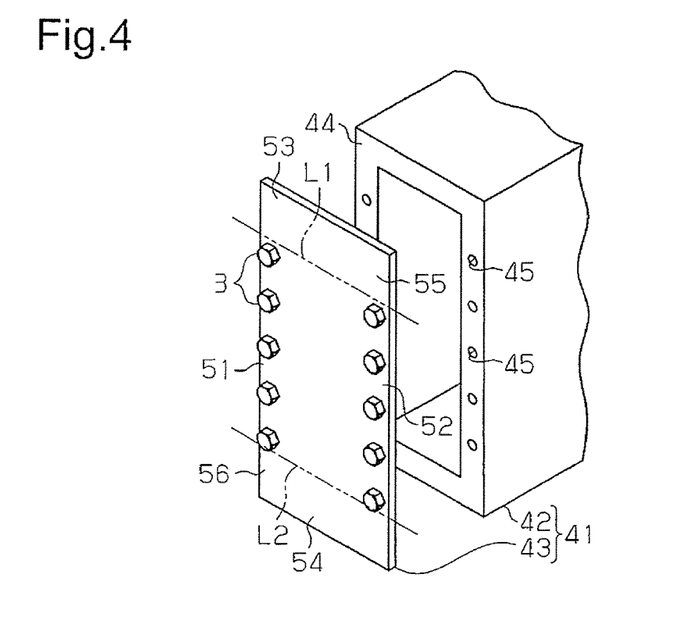
FIG. 4 is an enlarged perspective view illustrating a part including the lid member of the sealed case, which configures a battery pack.

As shown in FIGS. 3 and 4, a battery pack 30 includes a sealed case 41. The sealed case 41 accommodates a battery module M, which includes battery cells 61. The sealed case 41 includes a case main body 42 having an opening and a lid member 43 fixed to the case main body 42. The case main body 42 is shaped as a rectangular tube with a closed end. The lid member 43 is shaped like a rectangular flat plate. The case main body 42 has an opening edge 44 surrounding the opening. The opening edge 44 has threaded holes 45, into which bolts B are threaded. Each bolt B extends through the lid member 43 and is threaded to one of the threaded holes 45. Among the four ends 51 to 54 of the lid member 43, ends on opposite sides are defined as a first end 51 and a second end 52. The other ends, which are different from the first and second ends 51, 52 and on opposite sides from each other, are defined as a third end 53 and a fourth end 54.

The bolts B extend through through-holes provided in the first end 51 and the second end 52. The bolts B extend through the through-holes formed in a part of the first end 51 and the through-holes formed in a part of the second end 52. The bolts B are not provided in the vicinity of each corner of the lid member 43. That is, no bolt B is provided in a part of the first end 51 that is close to the third end 53, a part of the first end 51 that is close to the fourth end 54, a part of the second end 52 that is close to the third end 53, or a part of the second end 52 that is close to the fourth end 54. In other words, no bolts B are provided in the third end 53 or the fourth end 54. In each of the first and second ends 51, 52, the bolts B are aligned between the third end 53 and the fourth end 54.

A first imaginary line L1 connects one of the bolts B at the first end 51 that is closest to the third end 53 to one of the bolts B at the second end 52 that is closest to the third end 53. Specifically, the first imaginary line L1 connects the part of the bolt B at the first end 51 that is closest to the third end 53 to the part of the bolt B at the second end 52 that is closest to the third end 53. The area between the first imaginary line L1 and the third end 53 is a first releasing portion 55.

A second imaginary line L2 connects one of the bolts B at the first end 51 that is closest to the fourth end 54 to one of the bolts B at the second end 52 that is closest to the fourth end 54. Specifically, the second imaginary line L2 connects the part of the bolt B at the first end 51 that is closest to the fourth end 54 to the part of the bolt B at the second end 52 that is closest to the fourth end 54. The area between the second imaginary line L2 and the fourth end 54 is a second releasing portion 56.

When the internal pressure of the sealed case 41 increases, the first releasing portion 55 and the second releasing portion 56 start being deformed away from the opening edge 44. This creates a clearance between the first releasing portion 55 and the opening edge 44 and a clearance between the second releasing portion 56 and the opening edge 44. The gas in the sealed case 41 is discharged through these clearances. That is, parts of the lid member 43 are designed to function as valves for reducing the pressure in the sealed case 41.

A connector 47 is attached to the exterior of the sealed case 41. The connector 47 is electrically connected to the battery cells 61 accommodated in the sealed case 41. Wires 48 are connected to the connector 47. Each of the wires 48 are connected to one of the battery cells 61 via the connector 47. The wires 48 extend from the connector 47 to the communication hole 35. Specifically, the wires 48 are inserted in the communication hole 35 and connected to the connecting portion 23. With this configuration, when the charging plug P shown in FIGS. 1 and 2 is connected to the connecting portion 23, the battery cells 61 and the charging station S are electrically connected via the connecting portion 23, the wires 48, and the connector 47. In this case, the cable that supplies power to the battery module M is configured by the wires 48, which connect the connecting portion 23 and the connector 47 to each other.

Figure 5:
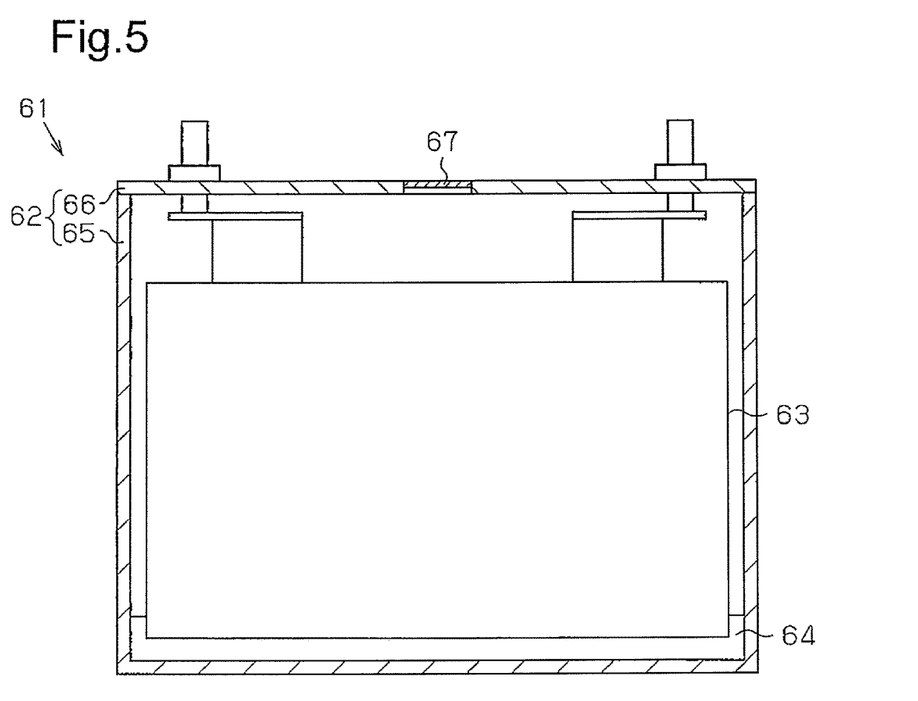
FIG. 5 is a cross-sectional view showing a battery cell.

As shown in FIG. 5, the battery cell 61 includes a battery case 62, an electrode assembly 63 accommodated in the battery case 62, and electrolytic solution 64. The battery cell 61 is, for example, a lithium-ion rechargeable battery or a nickel-metal hydride battery. The battery case 62 includes a main body 65 and a lid 66. The main body 65 accommodates the electrode assembly 63 and the lid 66 closes the opening of the main body 65. The main body 65 is shaped as a rectangular box. The lid 66 is shaped as a rectangular plate. The lid 66 has a pressure relief valve 67. The pressure relief valve 67 is opened when the internal pressure of the battery case 62 exceeds a specified pressure. The specified pressure is set such that, when the internal pressure of the battery case 62 increases, the pressure relief valve 67 is broken before the battery case 62 is damaged.

As shown in FIG. 3, the battery pack 30 is accommodated in the accommodating portion 31 with the lid member 43 facing away from the side wall 34 having the communication hole 35. Accordingly, the first releasing portion 55 and the second releasing portion 56 are arranged to face the upper wall 33, the bottom wall 32, and the side wall 34 on the opposite side from the side wall 34 having the communication hole 35. That is, among the walls that configure the accommodating body, the first releasing portion 55 and the second releasing portion 56 are arranged to face walls different from the side wall 34 having the communication hole 35. A releasing portion facing a wall portion of the accommodating body refers to a state in which, when the releasing portion is opened and gas is discharged, the wall exists in the discharging direction of the gas. That is, the wires 48, which are connected to the connector 47, are not arranged on the imaginary line that connects the inner surface of the wall of the accommodating body and an opening end of the opening edge 44 that is exposed when a releasing portion is opened. With the above described configuration, when the lid member 43 is deformed to create clearances between the opening edge 44 and the lid member 43, the gas in the sealed case 41 is discharged through the clearances. That is, it only needs to arrange a wall that is a part of the walls configuring the accommodating body in the direction in which the clearance is opened. In the present embodiment, the upper wall 33 and a side wall 34 are arranged in the opening direction of the first releasing portion 55, and the bottom wall 32 and a side wall 34 are arranged in the opening direction of the second releasing portion 56.

Operation of the battery unit U as described above will now be described wither reference to FIGS. 3 to 5.

As shown in FIGS. 3 and 5, when there is an abnormality in any of the battery cells 61, gas is generated in the battery case 62 and the internal pressure of the battery case 62 increases. When the internal pressure of the battery case 62 exceeds the specified pressure, the pressure relief valve 67 of the battery case 62 is broken. When the pressure relief valve 67 is broken, the gas in the battery case 62 is discharged to the interior of the sealed case 41.

When gas is discharged from the battery cell 61 to the interior of the sealed case 41 as shown in FIGS. 3 and 4, the internal pressure of the sealed case 41 increases. This opens the first releasing portion 55 and the second releasing portion 56 of the lid member 43. Then, the gas is discharged toward the upper wall 33 and the side wall 34 from the first releasing portion 55. Also, the gas is discharged toward the bottom wall 32 and the side wall 34 from the second releasing portion 56.

Accordingly, the above described embodiment provides the following advantages.

(1) The first releasing portion 55 is arranged to face the upper wall 33 and one of the side walls 34. Also, the second releasing portion 56 is arranged to face the bottom wall 32 and the side wall 34. Thus, when the internal pressure of the sealed case 41 increases and the first releasing portion 55 and the second releasing portion 56 are opened, the gas in the sealed case 41 is discharged toward the bottom wall 32, the upper wall 33, and the side wall 34. The wires 48 are therefore not directly exposed to the gas discharged from the sealed case 41. This restrains damage to the wires 48.

(2) The first releasing portion 55 and the second releasing portion 56 are arranged to face the side wall 34 on the opposite side from the side wall 34 having the communication hole 35. In this case, the gas reaches the wires 48 after a relatively long time from when the gas is discharged from the sealed case 41. Thus, when reaching the wires 48, the temperature of the gas has sufficiently dropped from the temperature immediately after being discharged from the sealed case 41. This further effectively restrains damage to the wires 48. Through the communication hole 35, the gas, the temperature of which has sufficiently dropped from the temperature immediately after being discharged from the sealed case 41, is discharged to the exterior of the vehicle body 11. This restrains damage to the charging station S by high-temperature gas.

The present embodiment may be modified as follows.

Figure 6:
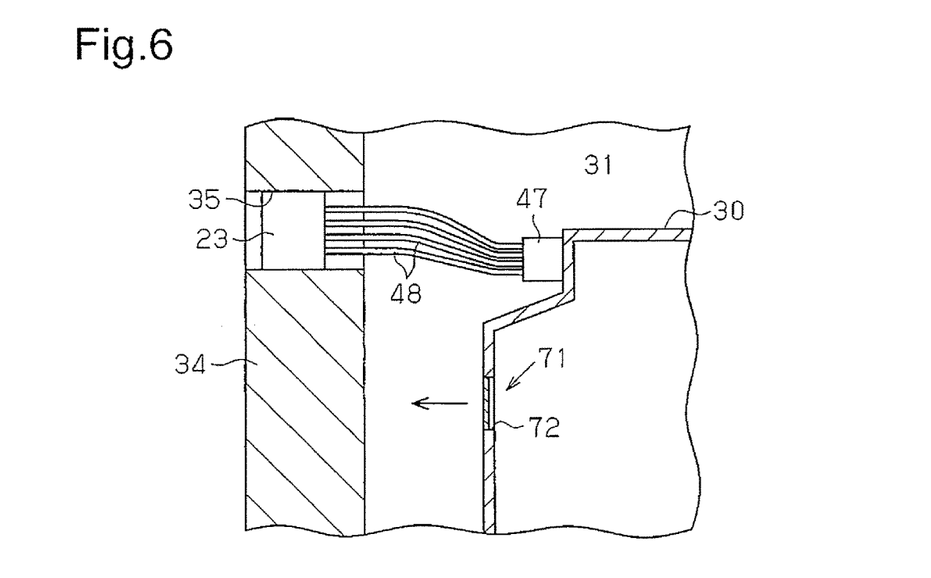
FIG. 6 is a cross-sectional view showing a battery unit of a modification.

As shown in FIG. 6, the releasing portion may be a valve 71, which is attached by a hole 72 in the sealed case 41. In this case, when the internal pressure of the sealed case 41 increases, the valve 71 is broken and opened. The gas in the sealed case 41 is discharged in the axial direction of the hole 72. That is, it only needs to arrange the communication hole 35 and the wires 48 at positions displaced from an imaginary line connecting the periphery of the hole 72 and the inner surface of the wall of the accommodating body. Also, the releasing portion that is opened when the valve 71 is broken may face the side wall 34 having the communication hole 35 as long as the releasing portion does not face the wires 48. The sealed case 41 may have a thin portion that is thinner than the remaining portion. In this case, the releasing portion corresponds to a part where the thin portion is broken and opened.

Figure 7:
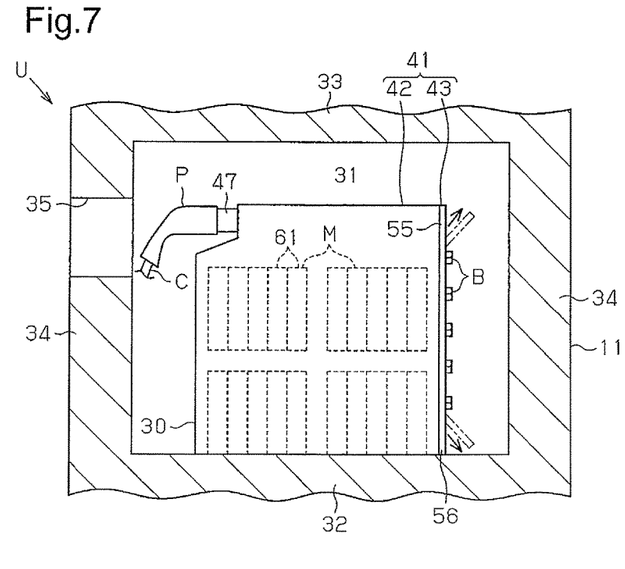
FIG. 7 is a cross-sectional view showing a battery unit of a modification.

As shown in FIG. 7, the connecting portion 23 in the communication hole 35 may be omitted. In this case, the charging plug P is inserted in the accommodating portion 31 via the communication hole 35 and is directly connected to the connector 47. In this case, the cable that supplies power to the battery module M is a cable C, which connects the charging station S and the charging plug P to each other. The cable C is connected to the connector 47 via the charging plug P and extends toward the communication hole 35 from the connector 47. This configuration also restrains damage to the charging plug P and the cable C.

The accommodating portion 31 may have any shape. For example, the accommodating portion 31 may be cylindrical or polygonal.

The accommodating body does not necessarily need to be the vehicle body 11, but may be a case that accommodates the battery pack 30. That is, the battery pack 30 may be mounted in an apparatus other than the forklift 10.

The external device may be a load connected to the battery pack 30. Specifically, the external device may be one of the vehicle driving motor M1 and the cargo handling motor M2, which are driven by the battery pack 30 as the power source. In this case, the accommodating body may have a communication hole 35 in which wires 48 connecting the load to the battery pack 30 are inserted.

The number of releasing portions may be one or greater than two.

The invention claimed is:

1. A battery unit comprising a battery pack and an accommodating body, wherein the accommodating body includes a plurality of walls and an accommodating portion, which accommodates the battery pack, wherein
   the battery pack includes:
      a battery module, which is configured by a plurality of battery cells;
      a sealed case, which accommodates the battery module; and
      a connector, which is provided in the sealed case and to which a cable for supplying power to the battery module is connected, wherein
   the accommodating body includes a communication hole, which connects an inside and an outside of the accommodating body to each other,
   the cable extends from the connector to the communication hole,
   the sealed case includes a releasing portion, which releases a pressure in the sealed case, and
   the releasing portion is arranged to face a first wall of the plurality of walls of the accommodating body; wherein
   the plurality of walls includes the first wall, which does not include the communication hole, and a second wall that includes the communication hole, and the releasing portion faces the first wall that does not have the communication hole.

2. The battery unit according to claim 1, wherein
   the releasing portion is arranged such that an imaginary line connecting the releasing portion and the first wall of the accommodating body does not overlap with the communication hole.

3. The battery unit according to claim 1, wherein the releasing portion is arranged to face the first wall of the plurality of walls of the accommodating body that is on an opposite side from the second wall that has the communication hole.

4. The battery unit according to claim 1, wherein
the releasing portion releases the pressure in the sealed case to an inside of the accommodating portion.

5. The battery unit according to claim 1, wherein
the first wall of the accommodating body, which does not have the communication hole is located in a discharging direction of the pressure when the releasing portion is opened.

6. The battery unit according to claim 1, wherein
the releasing portion is arranged not to face the communication hole,
the releasing portion is one of a first releasing portion and a second releasing portion, and
a distance between the first releasing portion and the cable is different from a distance between the second releasing portion and the cable.

\* \* \* \* \*

UNITED STATES PATENT AND TRADEMARK OFFICE
CERTIFICATE OF CORRECTION

PATENT NO. : 10,062,929 B2
APPLICATION NO. : 15/112857
DATED : August 28, 2018
INVENTOR(S) : Y. Chujo et al.

It is certified that error appears in the above-identified patent and that said Letters Patent is hereby corrected as shown below:

In the Claims

At Column 7, Line 11 (Claim 5, Line 3), please change "hole" to -- hole, --.

Signed and Sealed this
Twenty-sixth Day of March, 2019

Andrei Iancu
*Director of the United States Patent and Trademark Office*